Aug. 25, 1931.  G. T. HECKMAN  1,820,307
PADDLE WHEEL
Filed Oct. 25, 1928  2 Sheets-Sheet 1
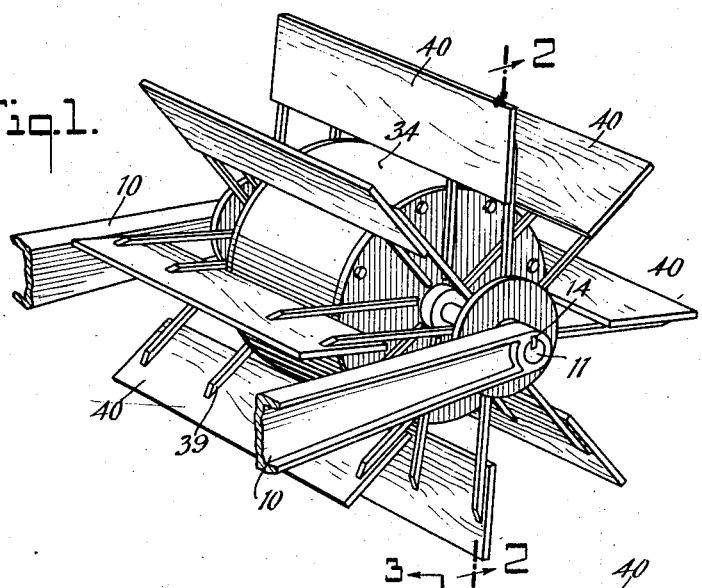
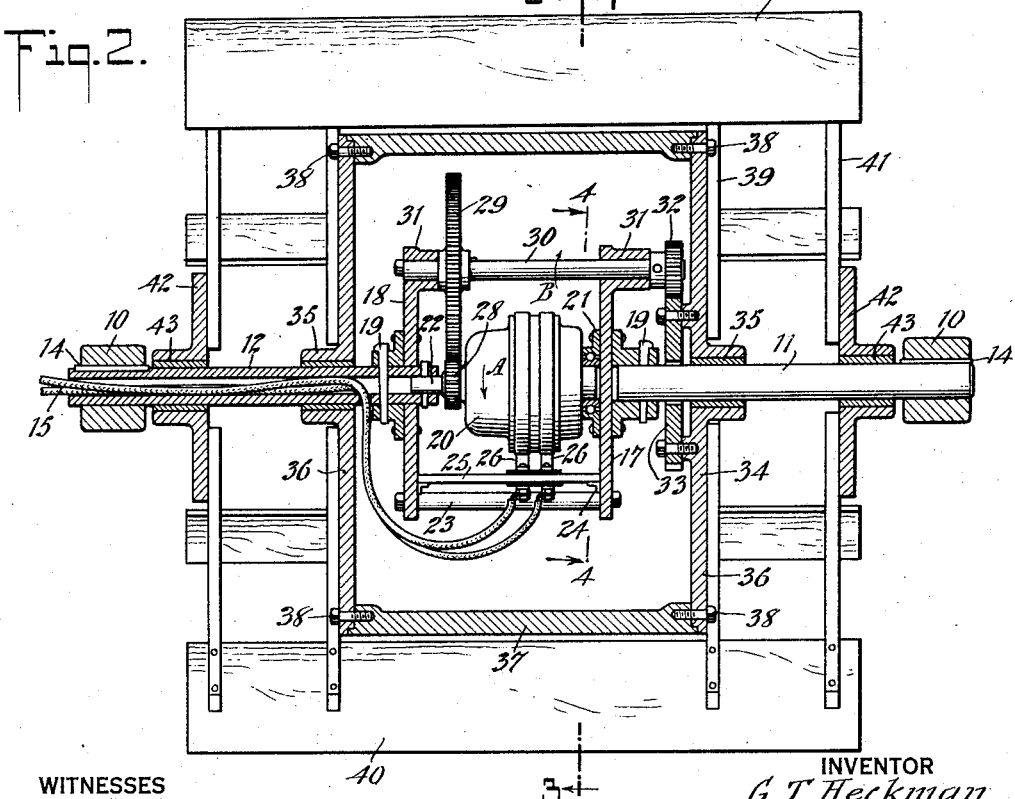
WITNESSES
INVENTOR
G. T. Heckman
BY
ATTORNEY Aug. 25, 1931.   G. T. HECKMAN   1,820,307
PADDLE WHEEL
Filed Oct. 25, 1928   2 Sheets-Sheet 2

WITNESSES

INVENTOR
G. T. Heckman
BY
ATTORNEY

Patented Aug. 25, 1931

1,820,307

UNITED STATES PATENT OFFICE

GEORGE T. HECKMAN, OF CLEVELAND, OHIO

PADDLE WHEEL

Application filed October 25, 1928. Serial No. 315,082.

This invention relates to power transmission means.

An object of the invention is to provide an improved power transmission means by which the power may be applied at a location very near the driven member.

Another object of the invention is to provide an improved power transmission means which will be compact in structure.

Another object is to provide an improved power transmission means in which the parts will be effectively housed and protected.

Other objects will hereinafter appear.

The invention will be better understood from the description of one practical embodiment thereof illustrating an application of my invention to a stern paddle wheel of a boat.

Fig. 1 is a perspective view of one embodiment of my present invention.

Fig. 2 is a vertical view partly in section as indicated by the line 2—2 of Fig. 1.

Figure 3:
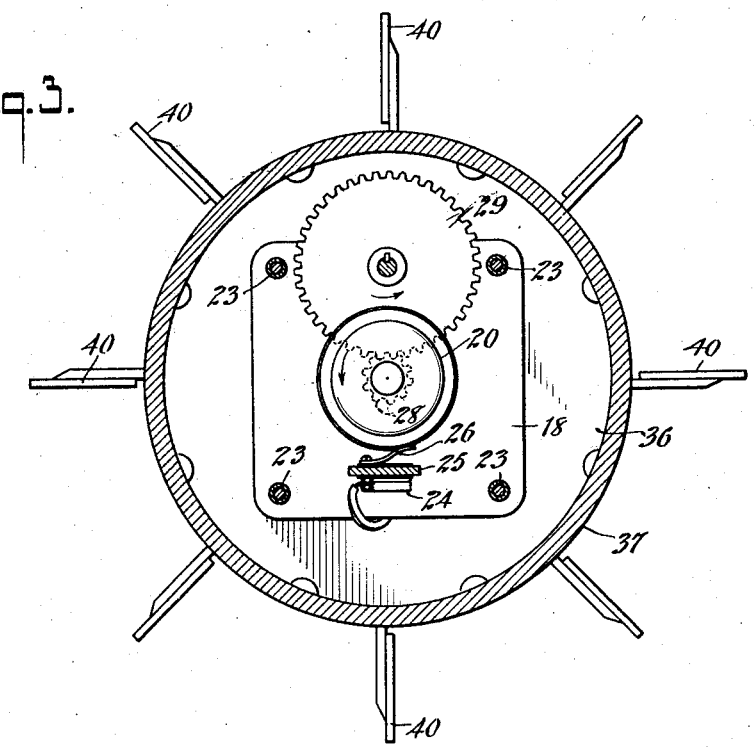
Fig. 3 is a sectional view taken on the lines 3—3 and looking in the direction of the arrows as indicated in Fig. 2.
Figure 4:
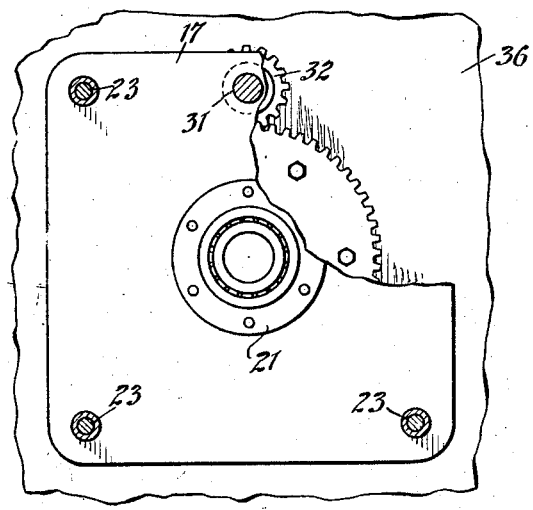
Fig. 4 is a view taken on the lines 4—4 of Fig. 2, looking in the direction of the arrows.

Referring more particularly to the drawings, the device is adapted to be mounted on suitable extending arms 10 which preferably extend rearwardly from any type of water vehicle. It will be understood that the type of vehicle with which the invention is employed and the specific structural details of the arms 10 as herein disclosed form no part of the present invention. The supporting beams 10 are of a type similar to those employed in present stern wheel boats, such as are used upon some of our inland waterways as a means of propulsion.

Mounted between the arms 10, axis members or shafts 11 and 12 are provided which are secured to the arms 10 to prevent rotation with respect thereto as by the provision of suitable keys 14. The shaft 11 may be solid and shown as terminating short of the midpoint between the arms 10. However, it will be obvious that a continuous shaft could be used and the parts surrounding the same installed thereupon. The opposite shaft 12 is preferably tubular and is adapted to provide a conduit for electrical conductors 15 as will be hereinafter described. Mounted upon the extremities of the axis members 11 and 12, motor frame end plates 17 and 18 respectively are provided preferably rectangular in configuration and securely associated with the inner ends of the axis members 11 and 12 as by keys 19, and are thus prevented from rotation.

Mounted between the plates 17 and 18 an electrical driving motor 20 is provided, one end of the casing or field portion of which is journalled in a suitable bearing mount 21 carried upon the inner face of the plate 17 while the opposite end of the casing or field is supported by a fixed pin 22 carried within and keyed to the inner end of the axis member 12. The plates 17 and 18 are retained in fixed spaced relation by the provision of connecting and spacing bolts 23 which may preferably be provided at each corner thereof. Midway between the sides of the plates 18 and on the lower portions thereof, contact members 24 are provided adapted to support a conductor-bearing cross pin 25 upon which electrical contacts 26 are provided which are adapted to supply electrical energy from the conductors 15 to the motor 20, the contacts or brushes 26 being illustrated in Figure 2 as in contact with two conducting rings carried upon the exterior of the motor housing, and thus cause rotation of the motor in responce to applied energy from the conductors 15.

Rotation of the motor 20 causes rotation of a driving pinion 28 carried upon the motor casing, and which meshes with and drives gear 29 mounted upon and feathered to a shaft 30, supported by bearing portions 31 of the plates 17 and 18. Keyed to the shaft 30, a second pinion 32 is provided which is adapted to mesh with and cause to rotate a driven gear 33 secured to a housing 34 mounted for rotation about the axis members or shafts 11 and 12 the housing being supported upon the shaft by means of bushings 35.

The housing 34 includes side members 36 which are centrally provided with the bushings 35 and a circumferential wall 37 to which the sides 36 are secured in water tight relation by the provision of screws 38. The housing 34 is shown as tubular in shape and is provided with radially extending arms 39 upon the extremities of which paddles or buckets 40 are mounted. The paddles 40 are adapted to extend beyond the sides 36 of the housing 34 and their extremities are adapted to be supported by arms 41 radially extending from bearing members 42 provided with bushings 43 surrounding the axis members 11 and 12.

In the operation of the device it will be seen that as electrical energy is applied through the conductors 15 to the motor 20, that the motor will be caused to rotate in a direction as indicated by the arrow A in Fig. 2; thus rotating the pinion 28 therewith and causing an opposite rotation of the gear 29 and shaft 30, as indicated by the arrow B (Fig. 2). It will be noted that the mounting of the motor 20 is such that its rotation can not effect rotation of the axis members 11 and 12, or motion of the plates 17 and 18 with respect to the axis members; thus, the motor assembly will at all times remain in the positions illustrated in Fig. 2; rotation of the motor causing rotation of the gear 33 to which the housing 34 is secured, whereby the housing 34 is rotated with respect to the axis members 11 and 12, and thus move the paddles 40 carried thereby in the usual manner desired for propulsion of water vehicles.

Thus, it may readily be seen that the illustrated embodiment of the invention provides within a paddle wheel an electrical operating unit and improved gear system; thus avoiding the necessity of external drive for the propulsion member. It will be readily noted that the gearing is such that high speed of the electrical motor 20 may be resorted to as through the provision of the reduction effect of the gearing, and slow, even and powerful rotation of the casing 34 carrying with it the paddles 40 may be attained. It will be readily understood that the housing 34 is watertight, thus preventing damage to the motor or associated gears by water. If desired, the casing 34 may be packed with grease or similar lubricant and thus the necessity of frequent lubrication of the device will be avoided.

By the use of reduction gearing, it is possible to use a relatively small and light motor having a high speed, and thus reduce the bulk and weight of the apparatus to very much less than this would be if a motor directly connected to the wheel were employed. The gearing shown is of the type used in back gears, but obviously, other types of gear trains may be used.

While I have described the illustrated embodiment of my invention in some particularity, obviously many others will readily occur to those skilled in this art, and I therefore do not limit myself to the precise details shown and described herein, but claim as my invention all embodiments, variations and modifications coming within the scope of the appended claims.

I claim:

1. A paddle wheel including a cylindrical housing coaxially associated with said wheel and rotatable therewith, spaced shaft members axially supporting said wheel and said housing and extending into the latter, a stationary frame mounted within said housing between the terminals of said shaft members, a rotary power driving means mounted within said frame, and means for imparting rotary movement from said driving means to said housing.

2. A paddle wheel including a cylindrical housing coaxially associated with said wheel and rotatable therewith, spaced shaft members axially supporting said wheel and said housing and extending into the latter, stationary spaced frame members within said housing and keyed to said shaft members at their terminals, an electric motor between said stationary frame members and rotatable between the same, a rotary shaft transversely mounted relatively to said spaced frame members, a driving gear to impart motion from said motor to said rotary shaft, and means to transfer rotary motion from said rotary shaft to said housing.

3. A paddle wheel including a cylindrical housing coaxially associated with said wheel and rotatable therewith, spaced shaft members axially supporting said wheel and said housing and extending into the latter, stationary spaced frame members within said housing and keyed to said shaft members at their inner terminals, an electric motor between said stationary frame members and rotatable between the same, a rotary shaft transversely mounted relatively to said spaced frame members, a driving gear to impart motion from said motor to said rotary shaft, a driving gear attached to said rotary shaft at one end of the same, a driven gear coaxially affixed to said housing and adapted to enmesh with said driving gear on said rotary shaft to impart rotary motion to said housing.

4. Power transmission mechanism comprising a support, a shaft carried thereby and held against rotation, a hollow housing supported on said shaft, a motor within the housing also supported by the shaft, a pinion rotated by said motor, a gear fixed to the interior of the housing, and a back shaft transmitting power from the pinion to the gear.

5. Propulsion mechanism comprising a vehicle, two longitudinally extending supports projecting beyond the vehicle, a transverse shaft carried by the supports and by them held against rotation, a hollow housing rotatably supported on the shaft, a driving member within the housing, a gear fixed to the interior of the housing, and a gear train between the driving member and the gear.

6. Propulsion mechanism comprising a shaft, a hollow housing rotatably carried thereby, a driving member within the housing having two relatively rotatable parts, one of which is secured to the shaft, and a gear train carried by the shaft between the other part of the driving member and housing.

7. Propulsion mechanism comprising a shaft, a hollow housing rotatably carried thereby, a driving member within the housing having two relatively rotatable parts one of which is secured to the shaft, and a power transmitting means between the other part of the driving member and housing.

8. Propulsion mechanism comprising a shaft, means for supporting said shaft transverse and outboard the hull of a boat and preventing the same from rotating, a hollow housing rotatably mounted upon the shaft, a prime mover carried by the hull of the boat, an electrical generator operated by said prime mover, conductors extending from said generator through the shaft to within the housing, an electric motor within the housing and connected to said conductors, one part of the motor being fixed to the shaft, a pinion carried by another part of said motor, a gear fixed to the interior of the housing, reduction gearing between said gear and pinion, and buckets carried by the exterior of the housing.

GEORGE T. HECKMAN.